(12) United States Patent
Son

(10) Patent No.: US 12,394,813 B2
(45) Date of Patent: Aug. 19, 2025

(54) FUEL CELL STACK ASSEMBLY DEVICE

(71) Applicants: HYUNDAI MOTOR COMPANY, Seoul (KR); KIA CORPORATION, Seoul (KR)

(72) Inventor: Kyung Sik Son, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 495 days.

(21) Appl. No.: 18/077,651

(22) Filed: Dec. 8, 2022

(65) Prior Publication Data

US 2023/0253604 A1 Aug. 10, 2023

(30) Foreign Application Priority Data

Feb. 4, 2022 (KR) .................. 10-2022-0014745

(51) Int. Cl.
*H01M 8/248* (2016.01)
*H01M 8/2404* (2016.01)

(52) U.S. Cl.
CPC ......... *H01M 8/248* (2013.01); *H01M 8/2404* (2016.02)

(58) Field of Classification Search
CPC ............................ H01M 8/248; H01M 8/2404
See application file for complete search history.

(56) References Cited

U.S. PATENT DOCUMENTS

| | | | | |
|---|---|---|---|---|
| 10,170,785 | B2* | 1/2019 | Ju | H01M 8/248 |
| 11,024,864 | B2* | 6/2021 | Walter | H01M 8/2404 |
| 2010/0159345 | A1* | 6/2010 | Shibata | H01M 8/247 |
| | | | | 429/535 |
| 2018/0138540 | A1* | 5/2018 | Kakuwa | H01M 8/2475 |
| 2020/0328432 | A1* | 10/2020 | Leger | H01M 8/0265 |
| 2022/0140379 | A1* | 5/2022 | Namba | H01M 8/248 |
| | | | | 429/467 |

FOREIGN PATENT DOCUMENTS

KR 2015-0144827 A 12/2015

* cited by examiner

*Primary Examiner* — Jonathan Johnson
(74) *Attorney, Agent, or Firm* — MCDONNELL BOEHNEN HULBERT & BERGHOFF LLP

(57) ABSTRACT

A fuel cell stack assembly device includes a rotating body disposed to be inclined in an up-down direction on a jig frame and rotatably installed on the jig frame, a press body installed to be movable in the up-down direction at an upper portion of the rotating body to correspond to a cell stacking base provided below the rotating body, at least one first swing body swingably installed at a front portion of the rotating body, at least one second swing body swingably installed at a rear portion of the rotating body, a cell stacking guide portion provided at each of the at least one first swing body and the at least one second swing body, and a cell fastening guide portion provided at each of the at least one first swing body and the at least one second swing body.

16 Claims, 14 Drawing Sheets

FUEL CELL STACK ASSEMBLY DEVICE

CROSS REFERENCE TO RELATED APPLICATIONS

This application claims priority to and the benefit of Korean Patent Application No. 10-2022-0014745 filed in the Korean Intellectual Property Office on Feb. 4, 2022, the entire contents of which are incorporated herein by reference.

BACKGROUND

(a) Field

An exemplary embodiment of the present disclosure relates to a fuel cell stack assembly device, and more particularly, to a fuel cell stack assembly device in which a plurality of unit cells are aligned and fastened.

(b) Description of the Related Art

As is known, fuel cell stacks are a kind of power generation devices that generate electric energy through an electrochemical reaction between hydrogen and oxygen by a plurality of unit cells.

For example, fuel cell stacks are applied to a fuel cell vehicle (commonly referred to as a 'hydrogen powered vehicle' or a 'hydrogen electric vehicle' by those skilled in the art).

Fuel cell stacks are electricity generating assemblies in which a plurality of unit cells are continuously arranged. Each of the plurality of unit cells includes a membrane electrode assembly (MEA) and separators disposed on both sides of the membrane electrode assembly, respectively.

In an example, the plurality of unit cells are fastened through an end plate and a band-type fastening member in a stacked and pressed state by a fuel cell stack assembly device, and may be assembled as a module-type fuel cell stack.

In another example, a plurality of unit cells may be fastened through an end plate and a box-type enclosure in a stacked and pressed state by the fuel cell stack assembly device, and may also be assembled as a module-type fuel cell stack.

Here, the fuel cell stack assembly device applied to another example includes a press mechanism for aligning and pressing a plurality of unit cells, and a press mechanism for aligning and pressing the enclosure.

Therefore, according to the related art, since the plurality of unit cells are aligned and pressed and the enclosure is aligned and pressed, assembling man-hours, equipment investment cost, and manufacturing cost are increased due to the alignment and pressing of the plurality of unit cells and the enclosure.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to provide a fuel cell stack assembly device having advantages of reducing assembling man-hours and facility investment costs associated with assembling a fuel cell stack.

An exemplary embodiment of the present disclosure provides a fuel cell stack assembly device including a rotating body disposed to be inclined in an up-down direction on a jig frame and rotatably installed on the jig frame, a press body installed to be movable in the up-down direction at an upper portion of the rotating body to correspond to a cell stacking base provided below the rotating body, at least one first swing body swingably installed at a front portion of the rotating body, at least one second swing body swingably installed at a rear portion of the rotating body, a cell stacking guide portion provided at each of the at least one first swing body and the at least one second swing body, and a cell fastening guide portion provided at each of the at least one first swing body and the at least one second swing body.

The cell stacking base may include at least one first connection recess connected to at least one guide groove respectively formed at front and rear edges of a lower end plate.

The press body may include at least one second connection recess connected to at least one guide groove respectively formed at front and rear edges of an upper end plate.

The at least one first swing body may include a first rotating block rotatably installed at each of an upper portion and a lower portion of the rotating body, and a first swing block connected to the first rotating block in the vertical (up-down) direction.

The at least one second swing body may include a second rotating block rotatably installed at each of an upper portion and a lower portion of the rotating body, and a second swing block connected to the second rotating block in the vertical (up-down) direction.

The first swing block may be fixedly and rotatably connected to the first rotating block through at least one first joint member.

The second swing block may be fixedly and rotatably connected to the second rotating block through at least one second joint member.

The cell stacking guide portion may be provided at each of a first section set in the first swing block and a second section set in the second swing block.

The cell fastening guide portion may be provided at each of a third section set in the first swing block and a fourth section set in the second swing block.

The cell stacking guide portion may be selectively disposed at a position corresponding to front and rear edges of the lower end plate, a plurality of unit cells, and the upper end plate stacked in the up-down direction on the cell stacking base.

The cell stacking guide portion may include guide protrusions formed at the first section and the second section in the up-down direction.

The guide protrusion may be coupled to at least one guide groove formed at each of front and rear edges of the lower end plate, the plurality of unit cells, and the upper end plate stacked in the up-down direction on the cell stacking base.

The cell fastening guide portion may be selectively disposed at a position corresponding to an enclosure configured to fasten the lower end plate, the plurality of unit cells, and the upper end plate pressed by the press body.

The cell fastening guide portion may include a guide block coupled to the third section and the fourth section in the up-down direction.

The guide block may be coupled to at least one connection recess formed at each of front and rear edges of the cell stacking base and the press body to support the enclosure.

The rotating body may include a first stopper provided to be retractable in the up-down direction to correspond to the first rotating block, and a second stopper provided to be retractable in the up-down direction to correspond to the second rotating block.

The first swing block may be fixed to the first rotating block, and the second swing block may be fixed to the second rotating block.

The cell stacking guide portion may be provided at each of the first section set in the first swing block and a second section set in the second swing block.

The cell fastening guide portion may be mounted to and detached from the first section and the second section.

The cell fastening guide portion may be fixed to each of the first section and the second section through at least one magnet.

According to an exemplary embodiment of the present disclosure, the assembly man-hours, equipment investment costs, and manufacturing costs for guiding and aligning a plurality of unit cells and both end plates and guiding and aligning an enclosure may be reduced.

In addition, the effects obtainable or predicted by the exemplary embodiments of the present disclosure are disclosed directly or implicitly in the detailed description of the exemplary embodiments of the present disclosure. That is, various effects predicted according to an exemplary embodiment of the present disclosure are disclosed in the detailed description to be described later.

BRIEF DESCRIPTION OF THE FIGURES

Since these drawings are for reference in describing an exemplary embodiment of the present disclosure, the technical spirit of the present disclosure should not be construed as being limited to the accompanying drawings.

It is to be understood that the drawings referenced above are not necessarily drawn to scale, but present a rather simplified representation of various preferred features illustrating the basic principles of the disclosure. Certain design features of the present disclosure, including, for example, particular dimensions, orientation, location, and shape, will be determined in part by the particular intended application and environment of use.

DETAILED DESCRIPTION

Hereinafter, exemplary embodiments of the present disclosure will be described in detail with reference to the accompanying drawings to allow those skilled in the art to practice the present disclosure. The present disclosure may be implemented in various different forms and is not limited to the examples as described herein.

The terminology used herein is for the purpose of describing specific exemplary embodiments and is not intended to limit the present disclosure. As used herein, the singular forms are also intended to include the plural forms, unless the context clearly dictates otherwise. As used herein, it should be understood that the terms 'include and/or 'including' refer to the presence of specified features, integers, steps, operations, elements and/or components, but do not exclude the presence or addition of one or more other features, integers, steps, operations, components, and/or groups thereof. As used herein, the term 'coupled' denotes a physical relationship between two components directly connected to each other or indirectly connected through one or more intervening components.

Furthermore, as used herein, the term 'and/or' includes any one or all combinations of one or more of the associated listed items. And, 'operably connected' or similar terms mean that at least two members are directly or indirectly connected to each other to transmit power.

Furthermore, "vehicle," "of vehicle," "automobile," or other similar terms used herein includes hydrogen powered vehicles. Such hydrogen-powered vehicles may include passenger vehicles, sport utility vehicles (SUVs), electric vehicle-based purpose-built vehicles (PBV), buses, trucks, and passenger automobiles including various commercial vehicles.

Hereinafter, exemplary embodiments of the present disclosure will be described in detail with reference to the accompanying drawings.

Figure 1:
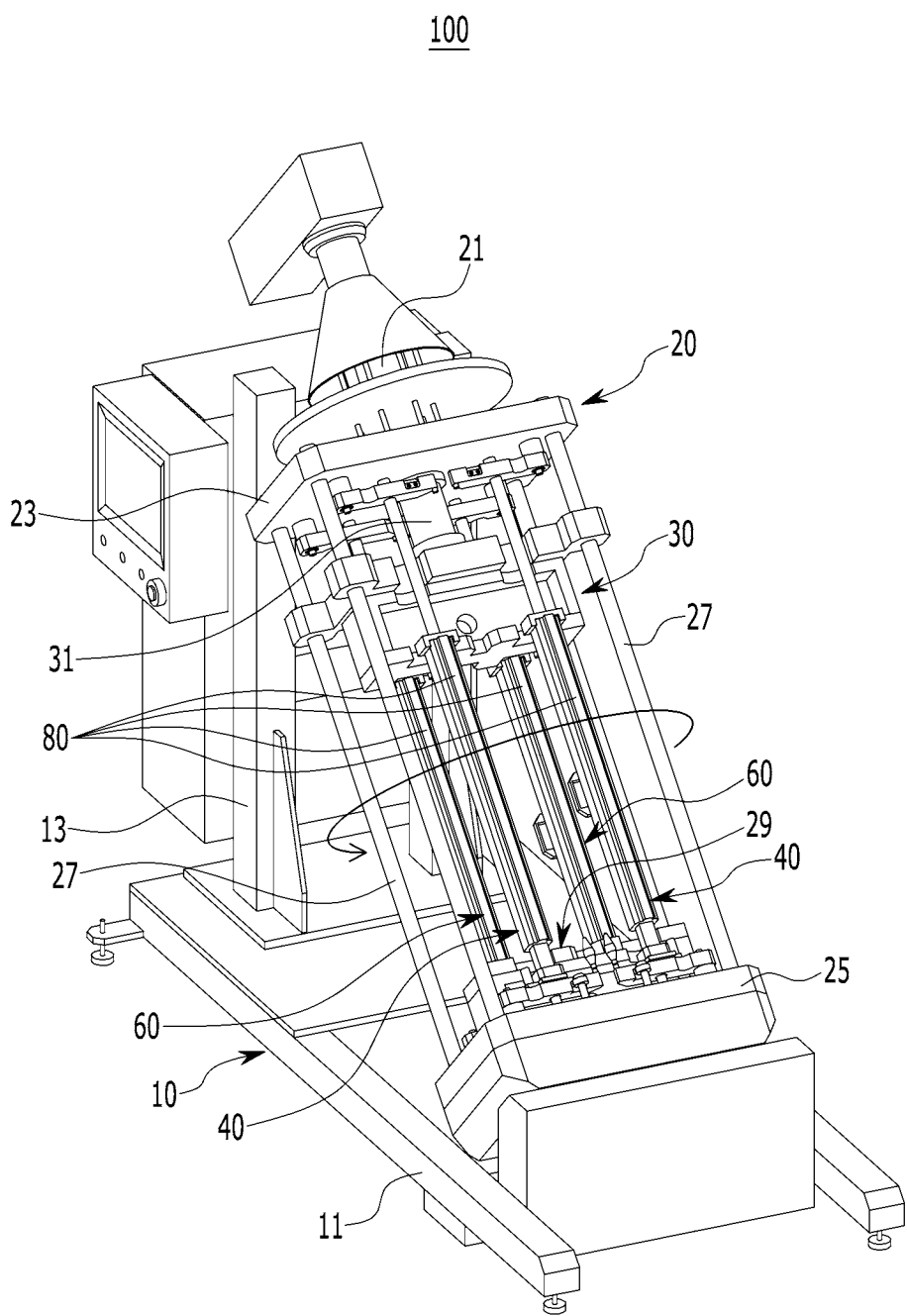
FIGS. 1 and 2 are perspective views illustrating a fuel cell stack assembly device according to an exemplary embodiment of the present disclosure.
Figure 2:
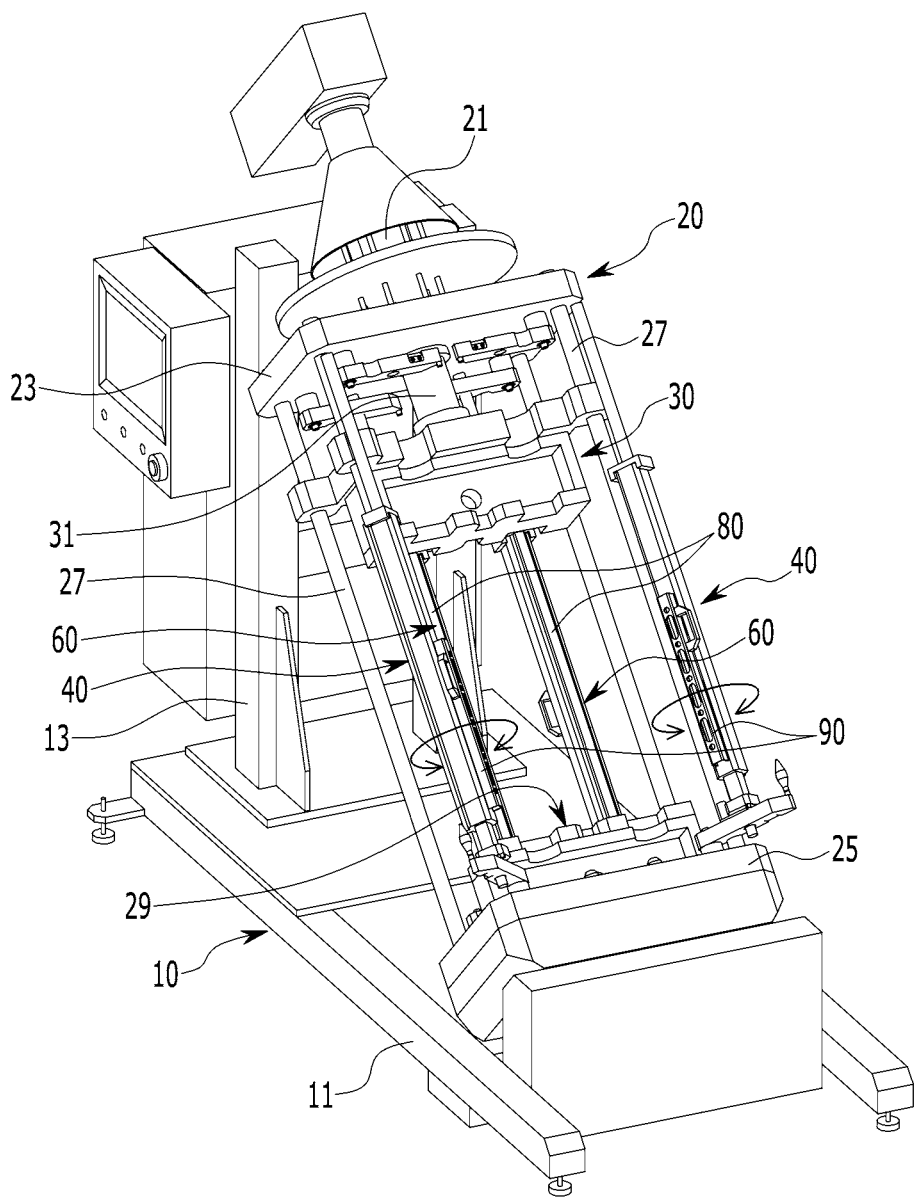

FIGS. 1 and 2 are perspective views illustrating a fuel cell stack assembly device according to an exemplary embodiment of the present disclosure.

Referring to FIGS. 1 and 2, a fuel cell stack assembly device 100 according to an exemplary embodiment of the present disclosure may be applied to a process of assembling a fuel cell stack 1 (refer to FIG. 3 below) mounted on a hydrogen-powered vehicle.

Figure 3:
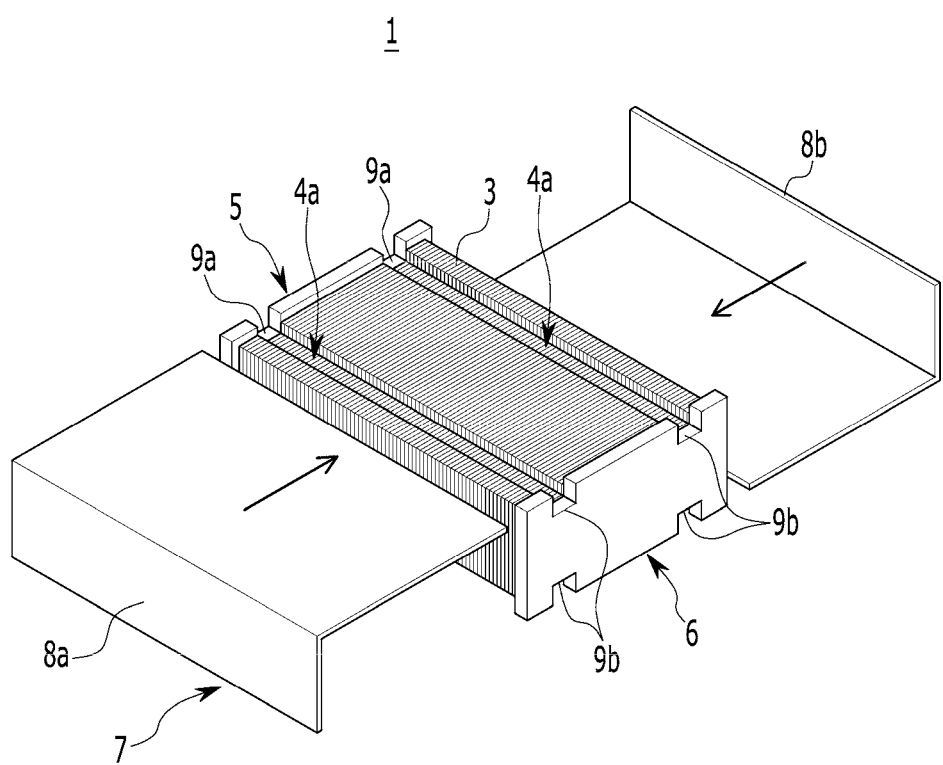
FIG. 3 is a view illustrating an example of a fuel cell stack assembled by a fuel cell stack assembly device according to an exemplary embodiment of the present disclosure.

As shown in FIG. 3, the fuel cell stack 1 assembled by the fuel cell stack assembly device 100 according to an exemplary embodiment of the present disclosure includes an assembly structure of a plurality of unit cells (commonly referred to as 'a plurality of fuel cells' by those skilled in the art) 3 generating electric energy by an electrochemical reaction between hydrogen gas and air.

Here, the plurality of unit cells 3 may be stacked on each other, and may be pressed by both end plates 5 and 6 disposed on the outermost sides, respectively. The both end plates 5 and 6 collect current generated in the plurality of unit cells 3 and supply and discharge hydrogen air and air.

Furthermore, the fuel cell stack 1 includes an enclosure 7 configured to protect the plurality of unit cells 3.

In an example, the enclosure 7 includes a pair of housing structures 8a and 8b bisected from each other. The pair of housing structures 8a and 8b may surround the plurality of aligned and pressed unit cells 3 and may be fastened to both end plates 5 and 6. Such an enclosure 7 may be mounted on a vehicle body of a hydrogen powered vehicle.

In an exemplary embodiment of the present disclosure, the fuel cell stack 1 as described above is described as being mounted on a hydrogen-powered vehicle, but the present disclosure is not limited thereto, and the technical spirit of the present disclosure may be applied to any fuel cell stack mounted on various mobile devices and power generation facilities.

In this disclosure, 'upper end portion, 'upper portion, 'upper end or 'upper surface' of a component indicates an end portion, part, end, or face of a component that is relatively upper in the drawing, and 'lower end portion', 'lower portion', 'lower end or 'lower surface' indicates an end portion, part, end, or face of a component that is relatively lower in the drawing.

In addition, in the present disclosure, the end (e.g., one end or the other end, etc.) of a component indicates the end of the component in any one direction, and an end portion of the component (e.g., one end portion or the other end portion, etc.) indicates a certain portion of the component including the end.

Meanwhile, in the present disclosure, among the both end plates 5 and 6, when viewed in an up-down direction, the end plate located below may be defined as a lower end plate 5, and the end plate located above may be defined as an upper end plate 6.

The fuel cell stack assembly device 100 according to an exemplary embodiment of the present disclosure is configured to align and press a plurality of unit cells 3 and both end plates 5 and 6 in the up-down direction and fasten the enclosure 7 to both end plates 5 and 6.

The fuel cell stack assembly device 100 according to an exemplary embodiment of the present disclosure has a structure that may reduce assembly man-hours and facility investment costs associated with assembling the fuel cell stack 1.

Referring to FIGS. 1 to 3, the fuel cell stack assembly device 100 according to an exemplary embodiment of the present disclosure includes a jig frame 10, a rotating body 20, a press body 30, and at least one first swing body 40, at least one second swing body 60, a cell stacking guide portion 80, and a cell fastening guide portion 90.

In an exemplary embodiment of the present disclosure, the jig frame 10 is fixed to a floor surface of a process workshop. In an example, the jig frame 10 includes a base frame 11 and a vertical frame 13 disposed on the base frame 11 in an up-down direction.

In an exemplary embodiment of the present disclosure, the rotating body 20 is disposed to be inclined in the up-down direction on the jig frame 10. That is, the rotating body 20 may be disposed to be inclined in a front-rear direction from an upper portion of the vertical frame 13 toward the base frame 11.

Furthermore, the rotating body 20 is rotatably installed on the vertical frame 13 of the jig frame 10. The rotating body 20 may be rotated by the driving of a first driving unit 21. The first driving unit 21 is installed on the vertical frame 13. The first driving unit 21 may include a servo motor well known to those skilled in the art.

The rotating body 20 includes an upper body 23 and a lower body 25. The upper body 23 is operatively connected to a first driving unit 21. The lower body 25 is disposed to be spaced apart from the upper body 23, and is connected to the upper body 23 through a plurality of support rods 27.

Figure 4:
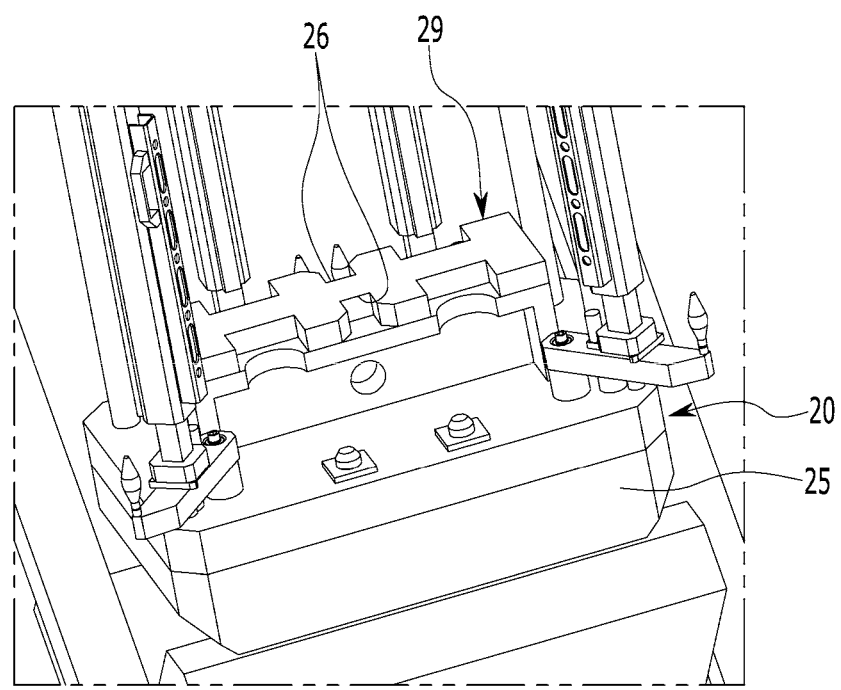
FIG. 4 is a view illustrating a cell stacking base of a rotating body applied to a fuel cell stack assembly device according to an exemplary embodiment of the present disclosure.

Here, the lower body 25 is provided with a cell stacking base 29 as shown in FIG. 4. The cell stacking base 29 is configured to support a plurality of unit cells 3 and both end plates 5 and 6.

The cell stacking base 29 includes at least one first connection recess 26 formed at front and rear edges, respectively. The at least one first connection recess 26 may be connected to the at least one first guide groove 9a (refer to FIG. 3) formed on the front and rear edges of the lower end plate 5 in the up-down direction.

Referring to FIGS. 1 to 4, in an exemplary embodiment of the present disclosure, the press body 30 is configured to press a plurality of unit cells 3 supported by the cell stacking base 29 of the lower body 25 of the rotating body 20, the lower end plate 5, and the upper end plate 6.

The press body 30 is installed to be movable in the up-down direction at an upper portion of the rotating body 20 to correspond to the cell stacking base 29 of the lower body 25.

Figure 5:
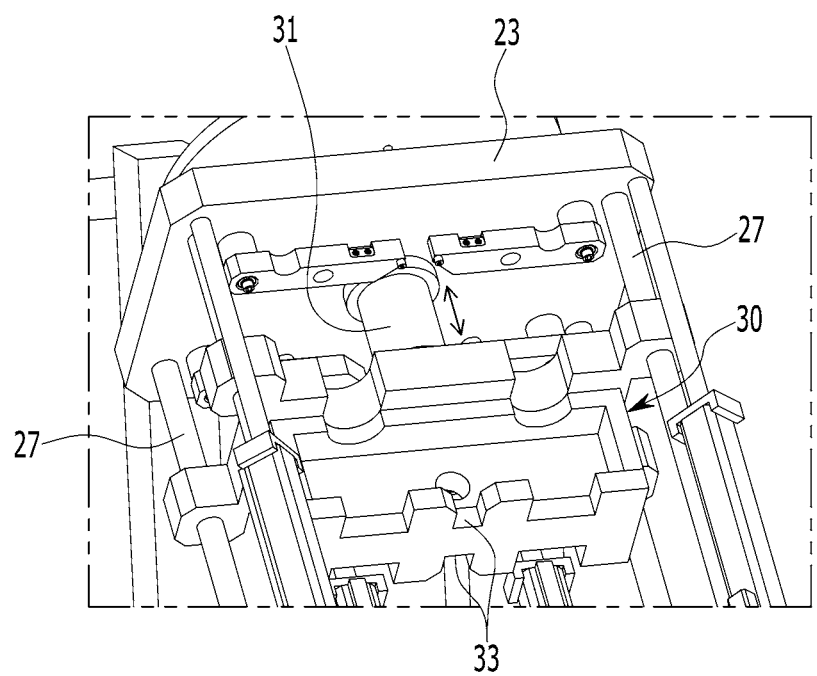
FIG. 5 is a view illustrating a press body applied to a fuel cell stack assembly device according to an exemplary embodiment of the present disclosure.

The press body 30 is installed to be movable in the up-down direction at the upper body 23 of the rotating body 20. As shown in FIG. 5, the press body 30 may be moved in the up-down direction by the driving of a second driving unit 31. The second driving unit 31 is installed at the upper body 23 and is operatively connected to the press body 30. The second driving unit 31 may include a working cylinder or servo motor well known to those skilled in the art.

The press body 30 is coupled to the plurality of support rods 27 to be movable in the up-down direction. The press body 30 includes at least one second connection recess 33 formed on each of front and rear edges. The at least one second connection recess 33 may be connected to the at least one second guide groove 9b formed on front and rear edges of the upper end plate 6 in the up-down direction.

Referring to FIGS. 1 and 2, in an exemplary embodiment of the present disclosure, at least one first swing body 40 is disposed between the front and the rear of the rotating body 20 with the cell stacking base 29 and the press body 30 interposed therebetween and is swingably installed at the front of the rotating body 20.

In an example, the at least one first swing body 40 may be installed on both sides of the front of the rotating body 20.

Figure 6:
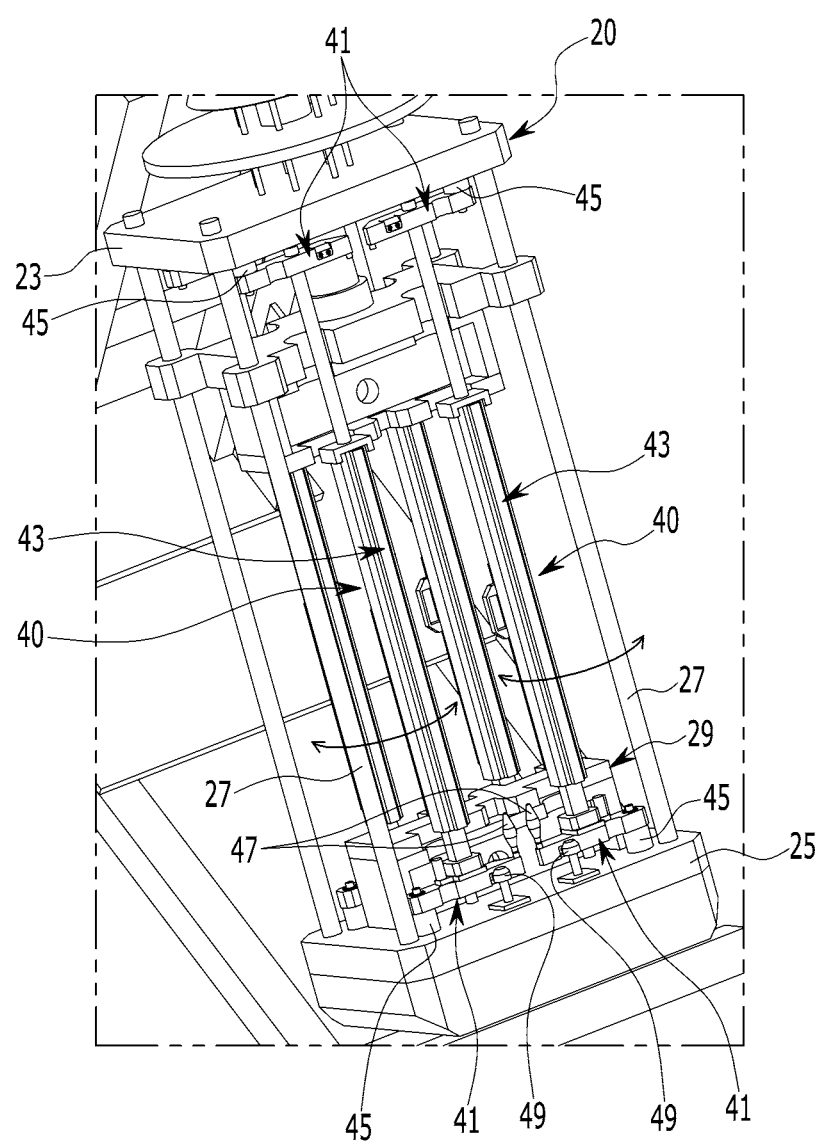
FIGS. 6, 7, 8A, and 8B are views illustrating a portion of a first swing body applied to a fuel cell stack assembly device according to an exemplary embodiment of the present disclosure.
Figure 7:
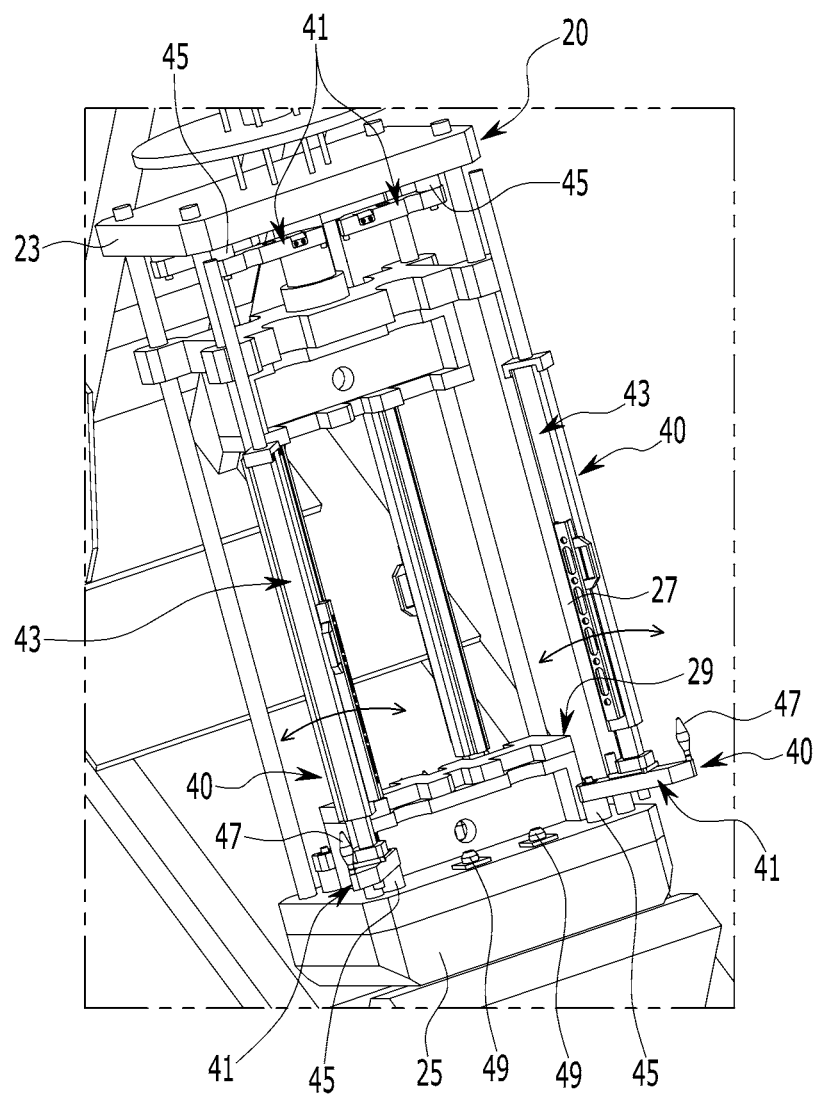
Figure 8:
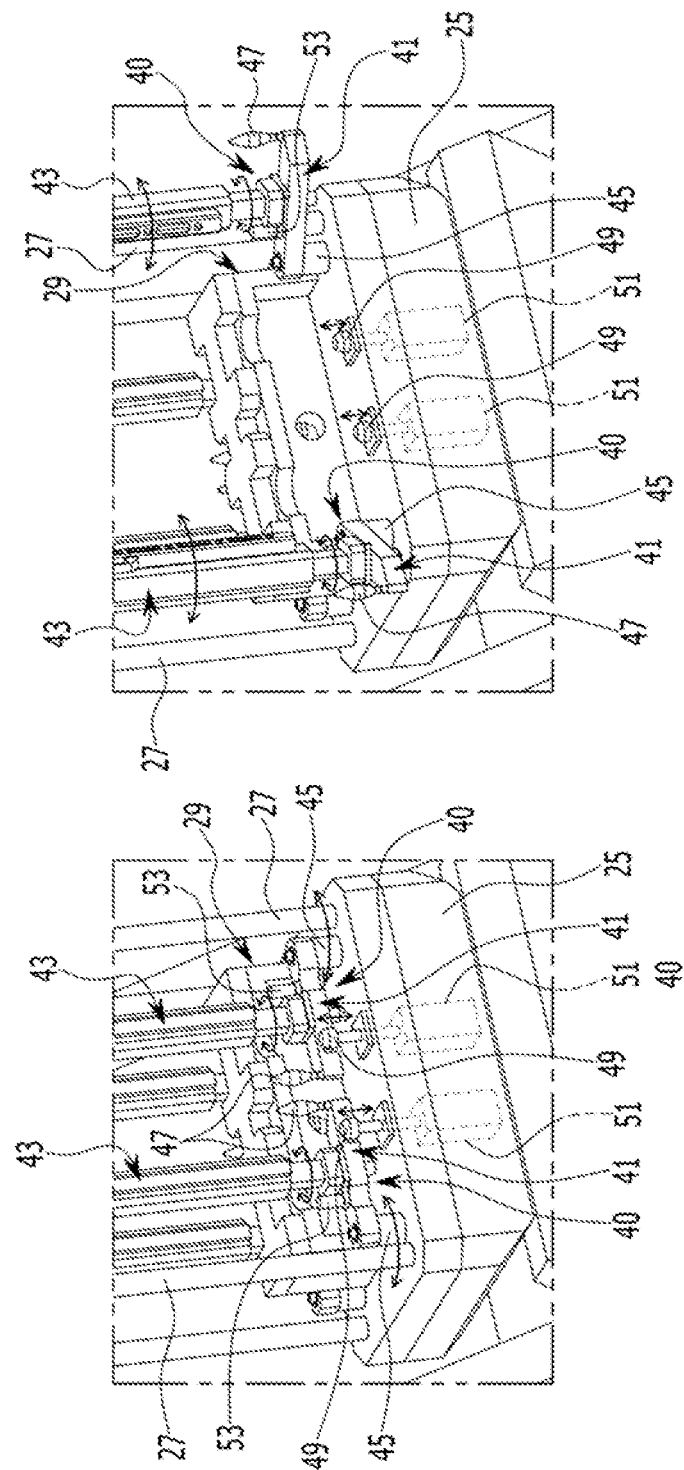

FIGS. 6 to 8 are views illustrating a portion of the first swing body applied to a fuel cell stack assembly device according to an exemplary embodiment of the present disclosure.

Referring to FIGS. 6 to 8, the at least one first swing body 40 according to an exemplary embodiment of the present disclosure includes a first rotating block 41 and a first swing block 43.

The first rotating block 41 is rotatably installed on each of upper and lower portions of the rotating body 20. The first rotating block 41 is rotatably installed on each of the upper body 23 and the lower body 25 of the rotating body 20. The first rotating block 41 may be rotated in a left-right direction (indicated by the arrow in the drawing) perpendicular to a front-rear direction of the rotating body 20.

The first rotating block 41 is rotatably coupled to a first rotating shaft 45 fixed to each of the upper body 23 and the lower body 25. The first rotating block 41 may be rotated in the left-right direction at a set rotation angle (e.g., 180 degrees).

The set rotation angle of the first rotating block 41 may be determined by the plurality of support rods 27 and the lower portion of the cell stacking base 29 as mentioned above. That is, the first rotating block 41 may be stopped by the plurality of support rods 27 and the lower portion of the cell stacking base 29.

Here, the first rotating block 41 provided at the lower body 25 includes a first handle 47. The first handle 47 is provided at an end opposite to an end coupled to the first rotating shaft 45 in the first rotating block 41.

Furthermore, in the rotating body 20, a first stopper 49 is installed at the lower body 25 provided with the first rotating block 41.

The first stopper 49 prevents the first rotating block 41 stopped at the lower portion of the cell stacking base 29 from being rotated toward the plurality of support rods 27. The first stopper 49 is installed at the lower body 25 to be retractable (movable) in the vertical (up-down) direction to correspond to the first rotating block 41.

In an example, the first stopper 49 may be operatively connected to the first working cylinder 51 provided at the lower body 25, and move in the vertical direction by driving the first working cylinder 51.

The first swing block 43 is connected to the first rotating block 41 in the vertical direction. The first swing block 43 may be swing-rotated in the horizontal (left-right) direction by the first rotating block 41.

In an example, the first swing block 43 may be provided in the form of a block in which four sides are formed in the front-rear direction and the horizontal direction.

The first swing block 43 may be fixedly and rotatably connected to the first rotating block 41 by at least one first joint member 53 (refer to FIG. 8). The at least one first joint member 53 may be provided as a pin that passes through a lower portion of the first swing block 43 and is fitted into the first rotating block 41.

When the at least one first joint member 53 is separated from the lower portion of the first swing block 43 and the first rotating block 41, the first swing block 43 may be supported by the first rotating block 41, and in this state, the first swing block 43 may be rotated in the left-right direction.

Also, when the at least one first joint member 53 passes through the lower portion of the first swing block 43 and is fitted into the first rotating block 41, the first swing block 43 may be fixed to the first rotating block 41.

Referring to FIGS. 1 and 2, in an exemplary embodiment of the present disclosure, the at least one second swing body 60 is disposed between the front and the rear of the rotating body 20 and swingably installed at the rear of the rotating body 20 with the cell stacking base 29 and the press body 30 interposed therebetween. That is, the at least one second swing body 60 is disposed at the rear portion of the rotating body 20 to correspond to the at least one first swing body 40.

In an example, the at least one second swing body 60 may be installed on both sides of the rear portion of the rotating body 20, respectively.

Figure 9:
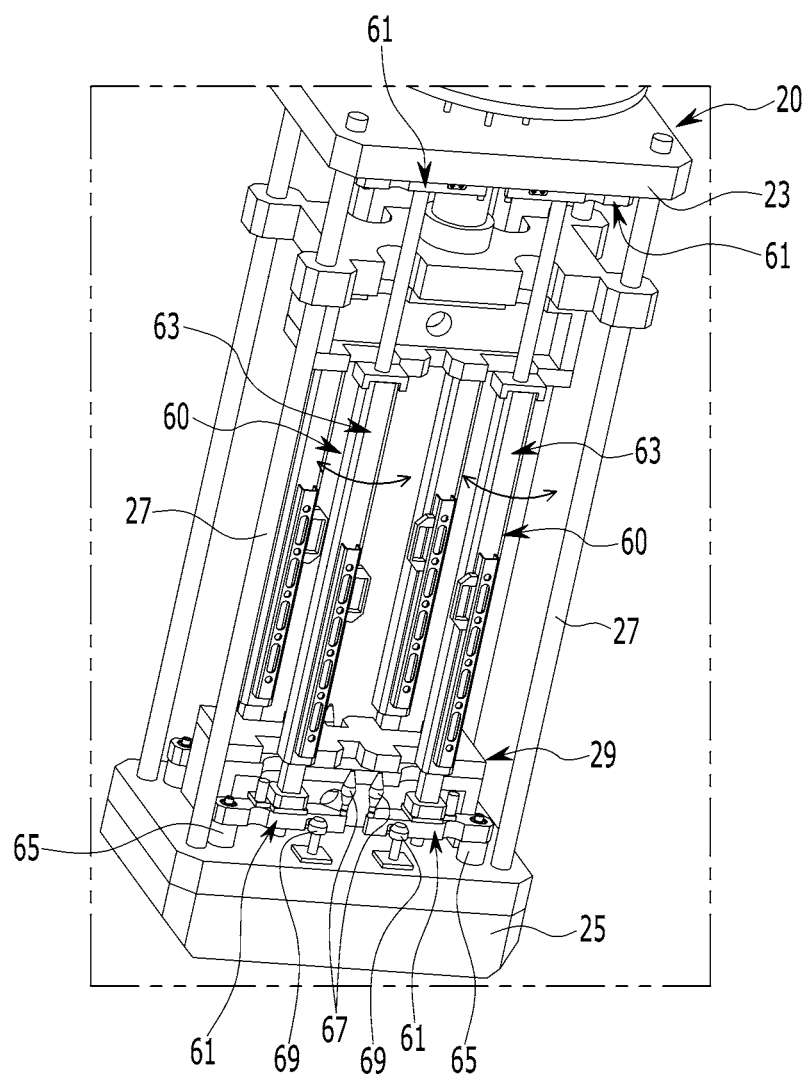
FIGS. 9, 10, 11A and 11B are views illustrating a portion of a second swing body applied to a fuel cell stack assembly device according to an exemplary embodiment of the present disclosure.
Figure 10:
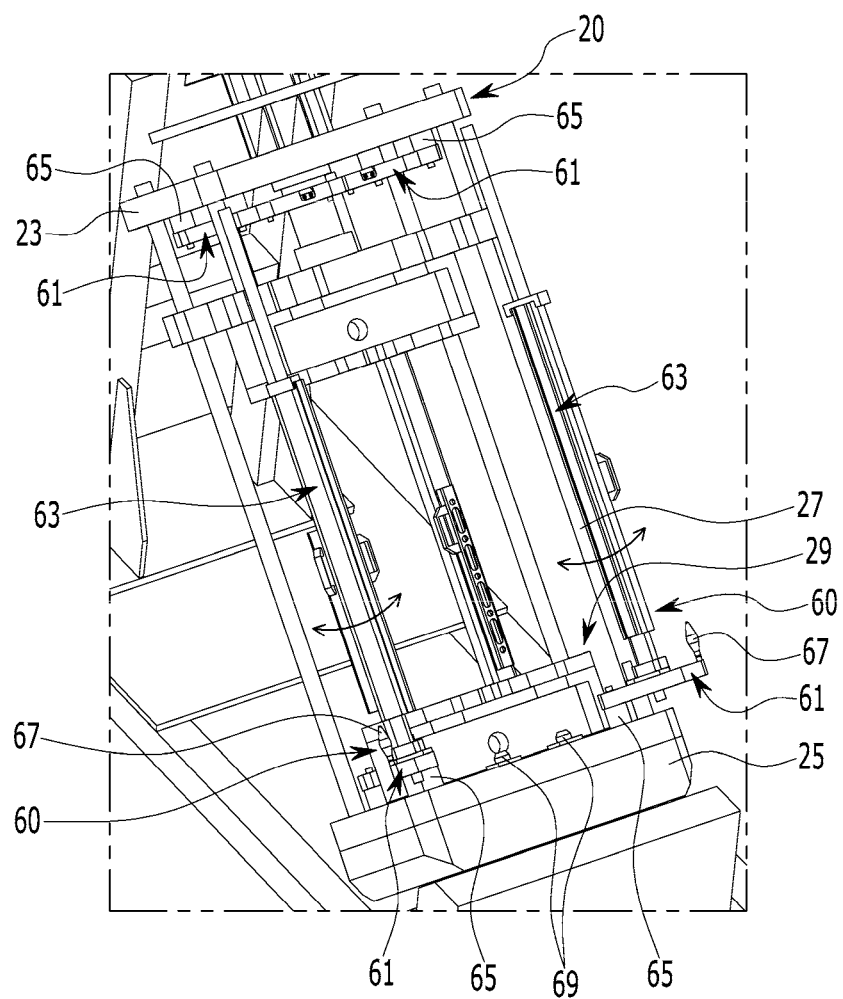
Figures 11A, 11B:
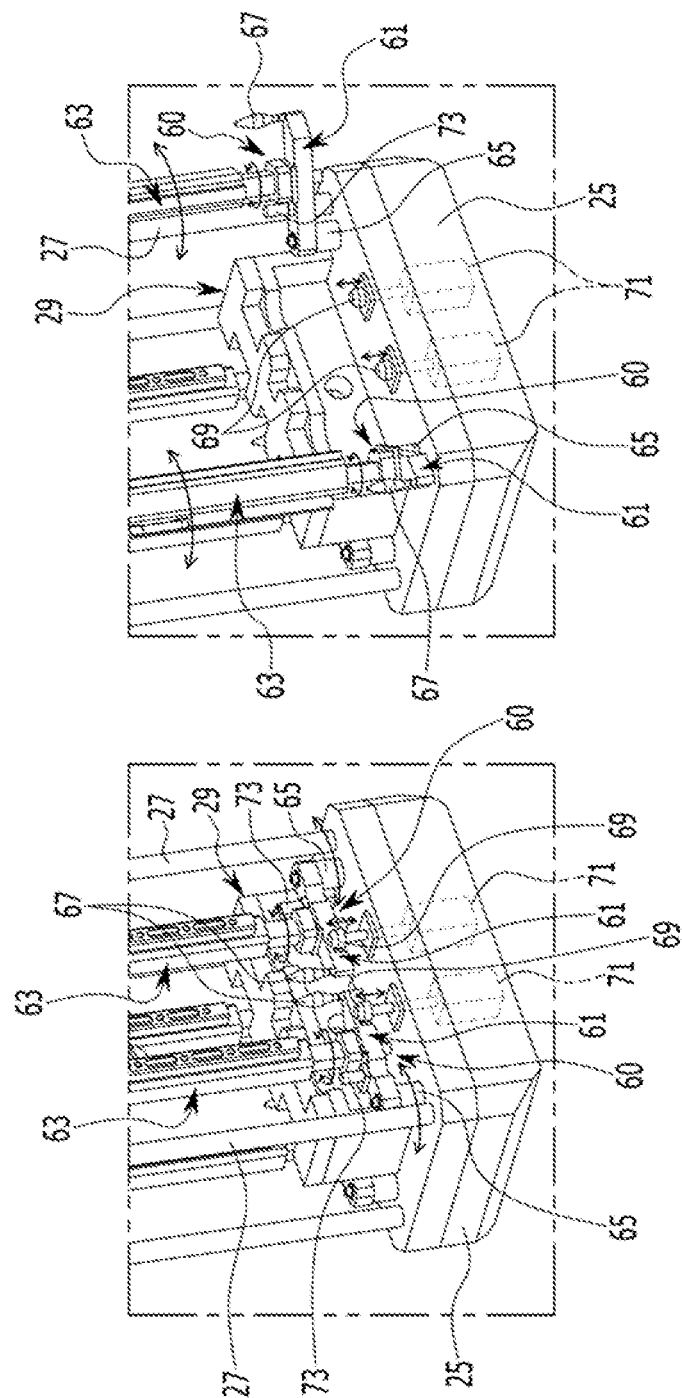

FIGS. 9 to 11 are views illustrating a portion of the second swing body applied to a fuel cell stack assembly device according to an exemplary embodiment of the present disclosure.

Referring to FIGS. 9 to 11, the at least one second swing body 60 according to an exemplary embodiment of the present disclosure includes a second rotating block 61 and a second swing block 63.

The second rotating block 61 is rotatably installed at each of upper and lower portions of the rotating body 20. The second rotating block 61 is rotatably installed at each of the upper body 23 and the lower body 25 of the rotating body 20. The second rotating block 61 may be rotated in the left-right direction (indicated by the arrow in the drawing) perpendicular to the front-rear direction of the rotating body 20.

The second rotating block 61 is rotatably coupled to a second rotating shaft 65 fixed to each of the upper body 23 and the lower body 25. The second rotating block 61 may be rotated in the left-right direction at a set rotation angle (e.g., 180 degrees).

The set rotation angle of the second rotating block 61 may be determined by the plurality of support rods 27 and the lower portion of the cell stacking base 29 as mentioned above. That is, the second rotating block 61 may be stopped by the plurality of support rods 27 and the lower portion of the cell stacking base 29.

Here, the second rotating block 61 provided at the lower body 25 includes a second handle 67. The second handle 67 is provided at an end portion opposite to the end portion coupled to the second rotating shaft 65 in the second rotating block 61.

Furthermore, in the rotating body 20, a second stopper 69 is installed at the lower body 25 provided with the second rotating block 61.

The second stopper 69 prevents the second rotating block 61 stopped at the lower portion of the cell stacking base 29 from being rotated toward the plurality of support rods 27. The second stopper 69 is installed at the lower body 25 to be retractable (e.g., movable) in the up-down direction to correspond to the second rotating block 61.

In an example, the second stopper 69 may be operatively connected to a second working cylinder 71 provided at the lower body 25, and move in the up-down direction by driving the second working cylinder 71.

The second swing block 63 is connected to the second rotating block 61 in the up-down direction. The second swing block 63 may be swing-rotated in the left-right direction by the second rotating block 61.

In an example, the second swing block 63 may be provided in the form of a block in which four sides are formed in the front-rear direction and the left-right direction.

The second swing block 63 may be fixedly and rotatably connected to the second rotating block 61 by at least one second joint member 73 (see FIG. 11). The at least one second joint member 73 may be provided as a pin that passes through a lower portion of the second swing block 63 and is fitted into the second rotating block 61.

When the at least one second joint member 73 is separated from the lower portion of the second swing block 63 and the second rotating block 61, the second swing block 63 may be supported by the second rotating block 61, and in this state, the second swing block 63 may be rotated in the left-right direction.

Also, when the at least one second joint member 73 passes through the lower portion of the second swing block 63 and is fitted into the second rotating block 61, the second swing block 63 may be fixed to the second rotating block 61.

Referring to FIGS. 6 to 11 together with FIGS. 1 and 2, in an exemplary embodiment of the present disclosure, the cell stacking guide portion 80 is configured to guide and align the lower end plate, the plurality of unit cells 3, and the upper end plate 6 vertically stacked on the cell stacking base 29 of the rotating body 20 (refer to FIGS. 3 and 4 below).

The cell stacking guide portion 80 is provided at each of the at least one first swing body 40 and at least one second swing body 60.

The cell stacking guide portion 80 may be selectively disposed in a position corresponding to front and rear edges of the lower end plate 5, the plurality of unit cells 3, and the upper end plate 6 stacked in the up-down direction on the cell stacking base 29.

Figure 12:
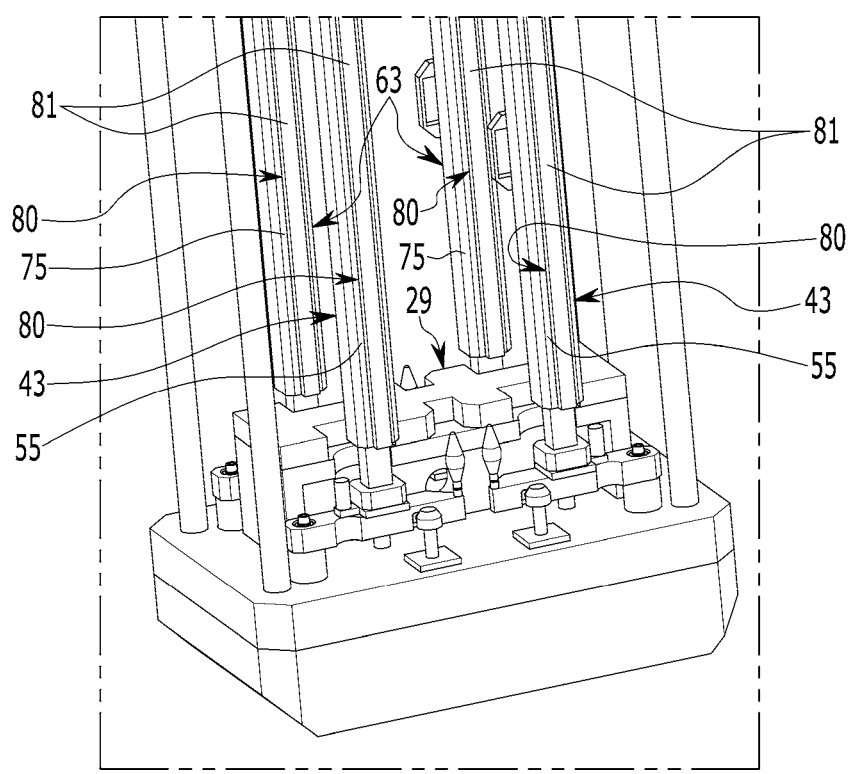
FIG. 12 is a view illustrating a cell stacking guide portion applied to a fuel cell stack assembly device according to an exemplary embodiment of the present disclosure.

The cell stacking guide portion 80 is provided at each of the first swing block 43 of the at least one first swing body 40 and the second swing block 63 of the at least one second swing body 60. Furthermore, as shown in FIG. 12, the cell stacking guide portion 80 is provided at a first section 55 set on four sides of the first swing block 43, and is provided at a second section 75 set on four sides of the second swing block 63.

Here, as the first swing block 43 and the second swing block 63 are selectively rotatable, the first section 55 may be a front or rear side among the four sides of the first swing block 43 and, the second section 75 may be a front or rear side among the four sides of the second swing block 63.

The cell stacking guide portion 80 includes guide protrusions 81 respectively formed at the first section 55 of the first swing block 43 and the second section 75 of the second swing block 63 in the up-down direction, respectively.

The guide protrusion 81 is formed to protrude from the first section 55 and the second section 75. The guide protrusion 81 is configured to substantially guide and align the lower end plate 5, the plurality of unit cells 3, and the upper end plate 6 stacked on the cell stacking base 29 in the up-down direction.

The guide protrusion 81 may be coupled to the front and rear edges of the lower end plate 5, the plurality of unit cells 3, and the upper end plate 6 in the up-down direction. Further, the guide protrusion 81 may be coupled to at least one first guide groove 9a respectively formed at front and rear edges of the lower end plate 5, at least one second guide groove respectively formed at front and rear edges of the upper end plate 6, and at least one third guide groove 4a respectively formed at front and rear edges of the plurality of unit cells 3 in the up-down direction (refer to FIG. 3).

Referring to FIGS. 6 to 11 together with FIGS. 1 and 2, in an exemplary embodiment of the present disclosure, the cell fastening guide portion 90 is configured to guide, align, and press the enclosure 7 fastening the lower end plate 5, a plurality of unit cells 3, and the upper end plate 6 pressed by the press body 30 (refer to FIGS. 3 and 4 below).

That is, the cell fastening guide portion 90 is configured to guide, align, and press each of a pair of bisected housing structures 8a and 8b of the enclosure 7 (refer to FIGS. 3 and 4 below).

The cell fastening guide portion 90 is provided at each of the at least one first swing body 40 and at least one second swing body 60. The cell fastening guide portion 90 may be selectively disposed at positions respectively corresponding to the pair of housing structures 8a and 8b of the enclosure 7.

The cell fastening guide portion 90 is provided at each of the first swing block 43 of the at least one first swing body 40 and the second swing block 63 of the at least one second swing body 60. Furthermore, as shown in FIG. 13, the cell fastening guide portion 90 is provided at a third section 57 set on four sides of the first swing block 43, and is provided at a fourth section 77 set on four sides.

Here, as the first swing block 43 and the second swing block 63 are selectively rotatable, the third section 57 may be a front or rear side among the four sides of the first swing block 43, and the fourth section 77 may be a front or rear side among the four sides of the second swing block 63.

Figure 13:
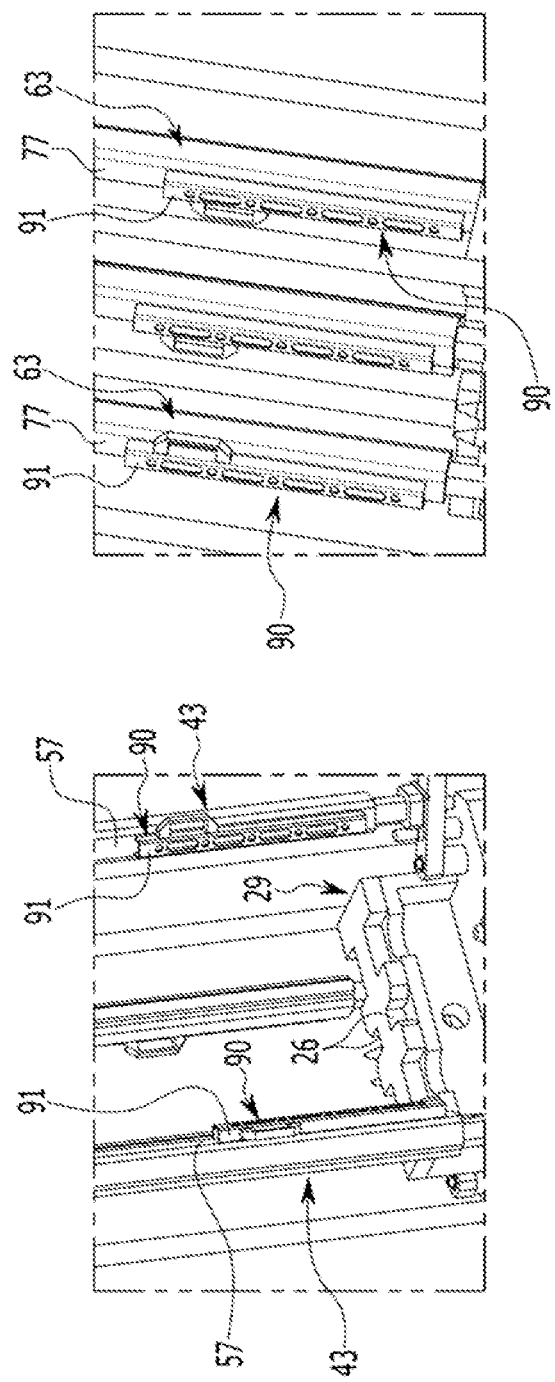
FIGS. 13A and 13B are views illustrating a cell fastening guide portion applied to a fuel cell stack assembly device according to an exemplary embodiment of the present disclosure.

In an example, as shown in FIG. 12, when the cell stacking guide portion 80 is provided at the first section 55 of the first swing block 43, as shown in FIG. 13, the cell fastening guide portion 90 may be provided at the third section 57 opposite to the first section 55.

Also, as shown in FIG. 12, when the cell stacking guide portion 80 is provided at the second section 75 of the second swing block 63, as shown in FIG. 13, the cell fastening guide portion 90 may be provided at the fourth section 77 opposite to the second section 75.

The cell fastening guide portion 90 includes a guide block 91 coupled to the third section 57 of the first swing block 43 and the fourth section 77 of the second swing block 63 in the up-down direction, respectively.

The guide block 91 may be configured to substantially guide, align, and press each of the pair of bisected housing structures 8a and 8b of the enclosure 7.

The guide block 91 may be coupled to the at least one first connection recess 26 of the cell stacking base 29 and the at least one second connection recess 33 of the press body 30 mentioned above to support each of the pair of housing structures 8a and 8b of the enclosure 7.

Hereinafter, the operation of the fuel cell stack assembly device 100 configured as described above and a method of assembling a fuel cell stack according to an exemplary embodiment of the present disclosure will be described in detail with reference to FIGS. 1 to 13.

First, in an exemplary embodiment of the present disclosure, the press body 30 is in a state of having moved in an upward direction through the plurality of support rods 27 by the driving of the second driving unit 31.

Here, the first rotating block 41 of the at least one first swing body 40 is rotated from the front of the rotating body 20 toward the plurality of support rods 27 (e.g., in an open state).

At this time, the first stopper 49 is in a state of having moved downward by the driving of the first working cylinder 51, and the first rotating block 41 is stopped by the plurality of support rods 27. Accordingly, the first swing block 43 of the at least one first swing body 40 is located to be adjacent to the plurality of support rods 27. In addition, the first swing block 43 is fixed to the first rotating block 41 by at least one first joint member 53.

In addition, the second rotating block 61 of the at least one second swing body 60 is in a state of having rotated from the rear portion of the rotating body 20 to a lower side of the cell stacking base 29 (e.g., in a closed state).

At this time, the second stopper 69 is in a state of having moved upward by the driving of the second working cylinder 71. The second stopper 69 prevents the second rotating block 61 from rotating toward the plurality of support rods 27. Accordingly, the second swing block 63 of the at least one second swing body 60 is located to be adjacent to the cell stacking base 29. In addition, the second swing block 63 is fixed to the second rotating block 61 by at least one second joint member 73.

Further, the cell stacking guide portion 80 faces the rear portion of the rotating body 20 at the first section 55 of the first swing block 43, and faces the front of the rotating body 20 at the second section 75 of the second swing block 63.

In addition, the cell fastening guide portion 90 faces the front of the rotating body 20 at the third section 57 of the first swing block 43, and faces the rear of the rotating body 20 at the fourth section 77 of the second swing block 63.

In this state, the lower end plate 5, the plurality of unit cells 3, and the upper end plate 6 are sequentially stacked on the upper surface of the cell stacking base 29 of the rotating body 20 in an upward direction.

At the second section 75 of the second swing block 63, the cell stacking guide portion 80 guides the lower end plate 5, the plurality of unit cells 3, and the upper end plate 6 in a downward direction to be aligned on the upper surface of the cell stacking base 29.

Here, the cell stacking guide portion 80 is coupled to at least one first guide groove 9a of the lower end plate 5, at least one third guide groove 4a of the plurality of unit cells 3, and at least one second guide groove 9b of the upper end plate 6 through the guide protrusion 81. Accordingly, the cell stacking guide portion 80 may guide and align the lower end plate 5, the plurality of unit cells 3, and the upper end plate 6 in the vertical direction.

Furthermore, since the rotating body 20 is disposed to be inclined in the vertical direction on the jig frame 10, the cell stacking guide portion 80 may guide and align the lower end plate 5, the plurality of unit cells 3, and the upper end plate 6 more easily.

In a state in which the lower end plate 5, the plurality of unit cells 3, and the upper end plate 6 are stacked as described above, the press body 30 is moved downward by the driving of the second driving unit 31. Then, the lower end plate 5, the plurality of unit cells 3, and the upper end plate 6 aligned on the upper surface of the cell stacking base 29 are pressed by the press body 30.

Then, one of the pair of housing structures 8a and 8b of the enclosure 7 is mounted at a portion of the lower end plate 5, a plurality of unit cells 3, and the upper end plate 6 pressed by the press body 30.

Next, the first rotating block 41 of the at least one first swing body 40 is rotated toward a lower side of the cell stacking base 29. Accordingly, the first swing block 43 of the at least one first swing body 40 is located to be adjacent to the cell stacking base 29. At this time, the first stopper 49 is moved upward by the driving of the first working cylinder 51, and prevents the first rotating block 41 from rotating toward the plurality of support rods 27.

Here, the cell fastening guide portion 90 facing the front of the rotating body 20 at the third section 57 of the first swing block 43 faces the rear of the rotating body 20. Also, the cell stacking guide portion 80 facing the rear of the rotating body 20 at the first section 55 of the first swing block 43 faces the front of the rotating body 20.

Further, in the third section 57 of the first swing block 43, the cell fastening guide portion 90 is coupled to the at least one first connection recess 26 of the cell stacking base 29 and the at least one second connection recess 33 of the press body 30 through the guide block 91. Accordingly, the cell fastening guide portion 90 guides, aligns, and presses one of the pair of housing structures 8a and 8b to a set position.

Then, one of the pair of housing structures 8a and 8b is fastened to the lower end plate 5 and the upper end plate 6 by fastening members (not shown) well known to those skilled in the art, such as bolts and nuts.

Thereafter, the rotating body 20 is rotated by 180 degrees in one direction by the driving of the first driving unit 21. Accordingly, the front and rear positions of the at least one first swing body 40 and the at least one second swing body 60 are interchanged from each other.

In this state, the second stopper 69 is moved downward by the driving of the second working cylinder 71. In addition, the second rotating block 61 of the at least one second swing body 60 is rotated toward the plurality of support rods 27. Accordingly, the second swing block 63 of the at least one second swing body 60 is located to be adjacent to the plurality of support rods 27. At this time, at the second section 75 of the second swing block 63, the cell stacking guide portion 80 faces the front of the rotating body 20. Also, at the fourth section 77 of the second swing block 63, the cell fastening guide portion 90 faces the rear of the rotating body 20.

Then, the at least one second joint member 73 is separated from the lower portion of the second swing block 63 and the second rotating block 61. Next, the second swing block 63 is rotated by 180 degrees in one direction, while being supported by the second rotating block 61.

Accordingly, at the second section 75 of the second swing block 63, the cell stacking guide portion 80 facing the front of the rotating body 20 faces the rear of the rotating body 20. Also, at the fourth section 77 of the second swing block 63, the cell fastening guide portion 90 facing the rear of the rotating body 20 faces the front of the rotating body 20.

Thereafter, the other of the pair of housing structures 8a and 8b of the enclosure 7 is mounted at the other portion of the lower end plate 5, a plurality of unit cells 3, and the upper end plate 6 pressed by the press body 30.

Next, the second rotating block 61 of the at least one second swing body 60 is rotated toward a lower side of the cell stacking base 29. Accordingly, the second swing block 63 of the at least one second swing body 60 is located to be adjacent to the cell stacking base 29. At this time, the second stopper 69 is moved upward by the driving of the second working cylinder 71, and prevents the second rotating block 61 from rotating toward the plurality of support rods 27.

Here, at the second section 75 of the second swing block 63, the cell stacking guide portion 80 facing the rear of the rotating body 20 faces the front of the rotating body 20. Also, at the fourth section 77 of the second swing block 63, the cell fastening guide portion 90 facing the front of the rotating body 20 faces the rear of the rotating body 20.

Further, at the fourth section 77 of the second swing block 63, the cell fastening guide portion 90 is coupled to the at least one first connection recess 26 of the cell stacking base 29 and the at least one second connection recess 33 of the press body 30 through the guide block 91. Accordingly, the cell fastening guide portion 90 guides, aligns, and presses the other of the pair of housing structures 8a and 8b to a set position.

Subsequently, the other of the pair of housing structures 8a and 8b is fastened to the lower end plate 5 and the upper end plate 6 by fastening members (not shown) well known to those skilled in the art, such as bolts and nuts.

Accordingly, the fuel cell stack assembly device 100 according to an exemplary embodiment of the present disclosure undergoes a series of processes as described above, and the fuel cell stack 1 in which the plurality of unit cells 3 are fastened by both end plates 5 and 6 and the enclosure 7 may be assembled.

Meanwhile, in the fuel cell stack assembly device 100 according to an exemplary embodiment of the present disclosure, when the series of processes described above is performed in the reverse order, a repair process of the plurality of unit cells 3 of the fuel cell stack 1 may be performed.

The repair process may be performed through the rotation of the first rotating block 41 and the first swing block 43 of the at least one first swing body 40 and the rotation of the second rotating block 61 and the second swing block 63 of the at least one second swing body 60.

The fuel cell stack assembly device 100 according to an exemplary embodiment of the present disclosure as described so far includes at least one first swing body 40 and at least one second swing body 60 provided in the rotating body 20 and the cell stacking guide portion 80 and the cell fastening guide portion 90 provided in the at least one first swing body 40 and the at least one second swing body 60.

Accordingly, the fuel cell stack assembly device 100 according to an exemplary embodiment of the present disclosure guides and aligns the plurality of unit cells 3 and both end plates 5 and 6, and guides and aligns the enclosure 7 in a single facility.

Accordingly, the fuel cell stack assembly device 100 according to an exemplary embodiment of the present disclosure may reduce assembly man-hours, equipment investment costs, and manufacturing costs for guiding and aligning the plurality of unit cells 3 and both end plates 5 and 6 and guiding and aligning the enclosure 7.

Furthermore, the fuel cell stack assembly device 100 according to an exemplary embodiment of the present disclosure may further improve the structural stability, repairability, and manufacturability of the fuel cell stack 1.

Figure 14:
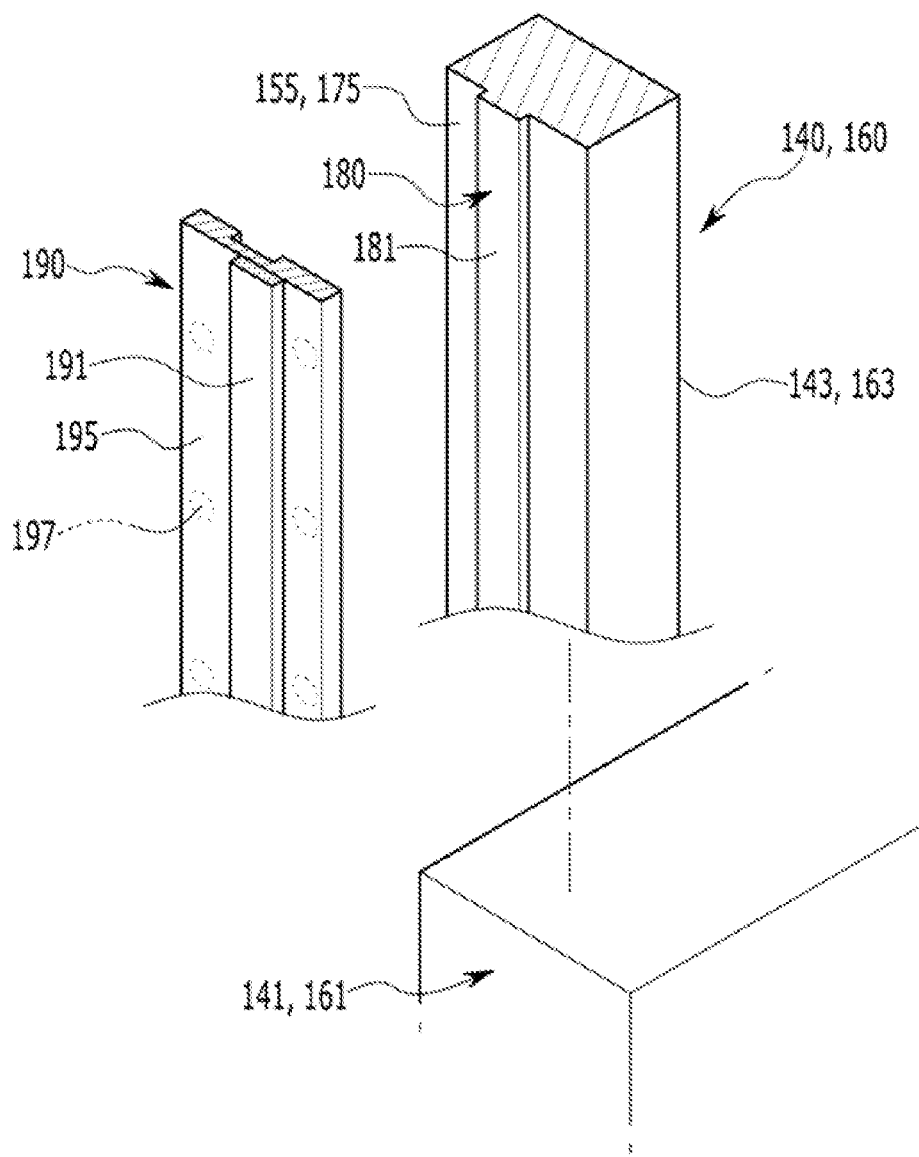
FIG. 14 is a view illustrating a modification of a fuel cell stack assembly device according to an exemplary embodiment of the present disclosure.

FIG. 14 is a view illustrating a modification of a fuel cell stack assembly device according to an exemplary embodiment of the present disclosure.

Referring to FIG. 14, in the modification of the fuel cell stack assembly device 100 according to an exemplary embodiment of the present disclosure, the first swing block 143 of the at least one first swing body 140 may be fixed to the first rotating block 141. Also, in the modification, the second swing block 163 of the at least one second swing body 160 may be fixed to the second rotating block 161.

Furthermore, in this modification, the cell stacking guide portion 180 may be provided at each of the set first section 155 of the first swing block 143 and the set second section 175 of the second swing block 163. The cell stacking guide portion 180 includes guide protrusions 181 protruding from the first section 155 and the second section 175, respectively.

Also, in this modification, the cell fastening guide portion 190 may be provided to be mounted on and detached from the first section 155 and the second section 175 described above. In an example, the cell fastening guide portion 190 may include a guide plate 195 and at least one magnet 197 provided at the guide plate 195.

Here, the guide block 191 is coupled to the guide plate 195. The guide plate 195 may be mounted (e.g., fixed) to each of the first section 155 and the second section 175 through at least one magnet 197, and may be detachable (e.g., separable) from the first section 155 and the second sections 175.

Accordingly, in a modification of the fuel cell stack assembly device 100 according to an exemplary embodiment of the present disclosure, since the position of the cell fastening guide portion 190 may be freely set through at least one magnet 197 based on the position of the cell stacking guide portion 180, the assembly man-hours required for assembling the fuel cell stack may be further reduced.

Although the exemplary embodiment of the present disclosure has been described above, the present disclosure is not limited thereto, and it is possible to carry out various modifications within the claim coverage, the description of the disclosure, and the accompanying drawings, and such modifications also fall within the scope of the present disclosure.

The invention claimed is:

1. A fuel cell stack assembly device comprising:
a rotating body inclined in a vertical direction on a jig frame and rotatably connected to the jig frame;
a press body movable in the vertical direction at an upper portion of the rotating body to correspond to a cell stacking base provided below the rotating body;
at least one first swing body swingably installed at a front portion of the rotating body;
at least one second swing body swingably installed at a rear portion of the rotating body;
a cell stacking guide portion provided at each of the at least one first swing body and the at least one second swing body; and
a cell fastening guide portion provided at each of the at least one first swing body and the at least one second swing body.

2. The fuel cell stack assembly device of claim 1, wherein:
the cell stacking base includes at least one first connection recess formed at a front edge of a lower end plate, the at least one first connection recess being connected to at least one guide groove formed at a rear edge of the lower end plate, and
the press body includes at least one second connection recess formed at a front edge of an upper end plate, the at least one second connection recess being connected to at least one guide groove formed at a rear edge of the upper end plate.

3. The fuel cell stack assembly device of claim 1, wherein:
the at least one first swing body includes:
a first rotating block rotatably installed at each of an upper portion and a lower portion of the rotating body; and
a first swing block connected to the first rotating block in the vertical direction.

4. The fuel cell stack assembly device of claim 3, wherein:
the at least one second swing body includes:
a second rotating block rotatably installed at each of an upper portion and a lower portion of the rotating body; and
a second swing block connected to the second rotating block in the vertical direction.

5. The fuel cell stack assembly device of claim 4, wherein:
the first swing block is fixedly and rotatably connected to the first rotating block through at least one first joint member, and
the second swing block is fixedly and rotatably connected to the second rotating block through at least one second joint member.

6. The fuel cell stack assembly device of claim 5, wherein:
the cell stacking guide portion is provided at each of a first section set in the first swing block and a second section set in the second swing block; and
the cell fastening guide portion is provided at each of a third section set in the first swing block and a fourth section set in the second swing block.

7. The fuel cell stack assembly device of claim 5, wherein:
the cell stacking guide portion is disposed at a position corresponding to front and rear edges of the lower end plate, a plurality of unit cells, and the upper end plate stacked in the vertical direction on the cell stacking base.

8. The fuel cell stack assembly device of claim 6, wherein:
the cell stacking guide portion includes guide protrusions formed at the first section and the second section in the vertical direction.

9. The fuel cell stack assembly device of claim 8, wherein:
the guide protrusion is coupled to at least one guide groove formed at each of front and rear edges of the lower end plate, the plurality of unit cells, and the upper end plate stacked in the up-down direction on the cell stacking base.

10. The fuel cell stack assembly device of claim 5, wherein:

the cell fastening guide portion is disposed at a position corresponding to an enclosure configured to fasten the lower end plate, the plurality of unit cells, and the upper end plate pressed by the press body.

11. The fuel cell stack assembly device of claim 10, wherein:

the cell fastening guide portion includes a guide block coupled to the third section and the fourth section in the vertical direction.

12. The fuel cell stack assembly device of claim 11, wherein:

the guide block is coupled to at least one connection recess formed at each of front and rear edges of the cell stacking base and the press body to support the enclosure.

13. The fuel cell stack assembly device of claim 4, wherein:

the rotating body includes:

a first stopper retractable in the vertical direction to correspond to the first rotating block; and a second stopper retractable in the vertical direction to correspond to the second rotating block.

14. The fuel cell stack assembly device of claim 4, wherein:

the first swing block is fixed to the first rotating block; and the second swing block is fixed to the second rotating block.

15. The fuel cell stack assembly device of claim 14, wherein:

the cell stacking guide portion is provided at each of the first section set in the first swing block and a second section set in the second swing block; and the cell fastening guide portion is mounted to and detached from the first section and the second section.

16. The fuel cell stack assembly device of claim 15, wherein:

the cell fastening guide portion is fixed to each of the first section and the second section through at least one magnet.

* * * * *